(12) United States Patent
Dwek

(10) Patent No.: US 6,248,946 B1
(45) Date of Patent: Jun. 19, 2001

(54) MULTIMEDIA CONTENT DELIVERY SYSTEM AND METHOD

(75) Inventor: Norman Scott Dwek, Deal, NJ (US)

(73) Assignee: iJockey, Inc., New York, NY (US)

( * ) Notice: Subject to any disclaimer, the term of this patent is extended or adjusted under 35 U.S.C. 154(b) by 0 days.

(21) Appl. No.: 09/516,768

(22) Filed: Mar. 1, 2000

(51) Int. Cl.[7] .................................................. G10H 1/26
(52) U.S. Cl. ..................... 84/609; 84/477 R; 84/DIG. 6; 434/307 A
(58) Field of Search ..................... 84/609–614, 634–638, 84/477 R, 478, DIG. 6; 434/307 A

(56) References Cited

U.S. PATENT DOCUMENTS

| | | | | |
|---|---|---|---|---|
| 5,890,910 | * | 4/1999 | Tsurumi et al. | 434/307 A |
| 5,947,746 | * | 9/1999 | Tsai | 434/307 A |
| 5,953,005 | * | 9/1999 | Liu | 434/307 A |
| 6,069,310 | * | 5/2000 | James | 84/645 |

* cited by examiner

*Primary Examiner*—Stanley J. Witkowski
(74) *Attorney, Agent, or Firm*—Long Aldridge & Norman, LLP

(57) ABSTRACT

A system and method for delivering multimedia content to computers over a computer network, such as the Internet, includes a novel media player which may be downloaded onto a user's personal computer. The media player includes a user interface which allows a listener to search an online database of media selections and build a custom playlist of exactly the music selections desired by the listener. The multimedia content delivery system delivers advertisements which remain visible on a user's computer display screen at all times when the application is open, for example, while music selections are being delivered to the user. The advertisements are displayed in a window which always remains on a topmost level of windows on the user's computer display screen, even if the user is executing one or more other programs with the computer.

20 Claims, 11 Drawing Sheets

MULTIMEDIA CONTENT DELIVERY SYSTEM AND METHOD

BACKGROUND OF THE INVENTION

1) Field of the Invention

This invention pertains to the field of multimedia content distribution, and more particularly, to a system and method for delivering multimedia content from a central database or repository to remotely distributed users over a network, such as the Internet.

2) Description of the Related Art

Multimedia applications have become an important driver for the growth of both the personal computer market and the Internet, indicating their popularity with users. It is apparent that many people enjoy listening to music or watching video programs via their computers, either in a standalone mode or, often, while performing other functions with the computer.

In the office environment, an increasing number of people work with a personal computer (PC). In that case, while working at their computers some workers may play music selections from a compact disc (CD), using the CD-ROM drive and audio processing components present in most new PCs. Also, someone working at home on their personal computer may listen to music while they work. Moreover, as more home computers are equipped and connected with hi-fidelity speaker systems, people may use a home computer as a audio music system, even when they are not using the computer for any other purposes.

However, it is sometimes the case that a person wants to hear one or more particular songs for which they do not presently have a copy of the recording. Also, it is often the case that a person wants to hear one or more music selections from a particular recording before making a purchase decision. And sometimes an individual may just want to hear a collection of songs from one particular artist. In other words, listeners desire the freedom and flexibility to choose exactly what songs they hear, in the order they choose, and at times of their own choosing.

Of course radio stations play music selections to which an individual may listen. Some PCs are equipped with radio tuners so that an individual may listen to broadcast radio stations via his or her PC. Moreover, many broadcast radio stations also transmit their broadcast audio signal over the Internet. And other specialized "Internet radio stations" have been developed which transmit a radio-like audio signal over the Internet only from a web site to which listeners connect. Thus, individuals may listen to many radio stations via a personal computer which is connected to the Internet.

For example, one advertisement-sponsored Internet web site known to the inventors, SPINNER.COM, allows a computer user to select from and listen to multiple Internet radio stations each of which is tailored to a particular musical format. SPINNER.COM uses its own downloadable music player for listeners to connect over the Internet with streaming audio servers associated with the SPINNER.COM radio stations. SPINNER.COM earns revenue to support its music service from Internet "banner ads" which appear in the music player window. Although a user may set the SPINNER.COM music player to remain on a topmost level of windows displayed on the user's computer display screen, the user may also allow the SPINNER.COM music player to be minimized or covered with other open windows on a user's computer display screen, so that the advertisements may not actually be viewed by the listener. In other words, the display of advertisements on the user's computer display screen is fully within the user's control. So the value of the advertisements to the advertisers is diminished.

But with Internet radio stations, as with AM and FM radio stations, the songs which are played are chosen by a program director and can not be tailored to each individual listener's choices. Neither broadcast nor Internet radio stations meet the desire for total flexibility of music choice by a listener.

Other Internet music services have been developed which allow a listener more freedom to choose the music selections which he or she wants to hear. Internet music services such as RADIO SONICNET and RADIOMOI.COM allow a listener a limited capability to program his or her own "customized" radio station.

RADIO SONICNET allows a listener to select and rank musical artists and musical categories of interest to the listener to create a customized radio station. RADIO SONICNET then provides the listener with a list of musical artists whose music will be played on the radio station. Individual song selections, play frequency, and song order are all determined by the RADIO SONICNET music service without any direct listener control. To create a "custom" radio station, a listener interacts with musical preference forms supplied to his or her computer's existing Internet web browser over an Internet connection with the RADIO SONICNET web site. All songs are delivered from the RADIO SONICNET server(s) to the listener's computer over an Internet connection with the listener's web browser, and are played on the listener's computer by one or more plug-ins or helper applications associated with the web browser. RADIO SONICNET earns revenue to support its music service from Internet "banner ads" which are displayed in the listener's browser window on the user's computer display screen while music selections are streamed to his or her computer. However, the user's web browser may be minimized or covered with other open windows on the computer display screen, so that the ads may not be viewed by the user. So, once again, the value of the advertisements to the advertisers is diminished.

Meanwhile, RADIOMOI.COM allows a listener to search a database of available songs by song title, artist, etc., and to add particular songs to a playlist for a "custom" radio station for that listener. The database of songs is divided into non-interactive and interactive songs. Once the listener has completed his or her playlist, he or she must submit it to the RADIOMOI music service for approval. The music service then checks the playlist against a predetermined set of rules and informs the listener whether the playlist has been approved or rejected. A playlist of only interactive songs is automatically approved. If the playlist is approved, then the listener may request that the music service begin streaming the songs on the playlist to the listener's computer via the Internet. However, the playlist may be rejected by the music service for one or more reasons, such as having too many consecutive songs by a same artist or from a same album or CD recording. In that case, the listener must edit his or her playlist to conform to the RADIOMOI music service's rules or to contain only interactive songs.

To create a "custom" radio station with RADIOMOI, a listener interacts with song and artist selection forms supplied to his or her computer's existing Internet web browser over an Internet connection with the RADIOMOI.COM web site. All songs are delivered from the RADIOMOI.COM server(s) to the listener's computer over an Internet connection with the listener's Internet web browser, and are played on the listener's computer by one or more plug-ins or helper applications associated with the web browser. RADIO-MOI.COM earns revenue to support its music service from Internet "banner ads" which are displayed in the Internet browser window on the user's computer display screen while music selections are streamed to his or her computer. However, as with RADIO SONICNET, the user's web browser may be minimized or covered with other open windows on a user's computer display screen, so that the ads may not be viewed by the listener.

Accordingly, all of these previous multimedia delivery systems and methods suffer from several disadvantages. For example, none of the previous systems is well adapted to providing an effective advertisement vehicle to support a free Internet music service. In these previous systems, the music player or Internet browser through which the music is being delivered can be minimized or covered on a user's computer display screen by other windows which are open for other active programs. So any ads which are being delivered for display through the music player are not necessarily visible to the user and may not be viewed by the user. This diminishes the value of the advertisements to sponsors, and therefore reduces the amount a sponsor will pay to have the advertisement delivered. In turn, the reduced advertising revenues limit the available funds for purchasing music licensing rights, distribution bandwidth, hardware, and other resources for supporting a free Internet music service.

Accordingly, it would be advantageous to provide a system and method of multimedia content delivery over a computer network which provides increased value to advertisers. It would also be advantageous to provide a system and method of multimedia content delivery over a computer network which provides increased flexibility to users. It would still further be advantageous to provide such a system and method which can deliver multimedia content over the Internet. Other and further objects and advantages will appear hereinafter.

SUMMARY OF THE INVENTION

The present invention comprises a system and method for delivering multimedia content to computers over a computer network, such as the Internet.

In one aspect of the invention, a multimedia content delivery system includes a novel media player which may be downloaded onto a user's personal computer. The media player comprises a user interface which allows a user to search an online database of media selections and build a custom playlist.

In another aspect of the invention, a multimedia content delivery system delivers advertisements which remain visible on a user's computer display screen at all times while a music player is open on a computer user's computer display screen. The advertisements are displayed in a window which always remains on a topmost level of windows on the user's computer display screen even if the user is executing one or more other programs with the computer.

DESCRIPTION OF THE PREFERRED EMBODIMENTS

For ease of explanation, the preferred embodiments described herein pertain to the delivery of musical content from a central music library to a plurality of users via the Internet. Nevertheless, it will be understood that the invention is not limited to the delivery of music, but could be used to deliver video or other streaming multimedia content. Also, delivery does not have to occur via the Internet but could also be accomplished over an intranet or a dedicated dial-up network.

Figure 1:
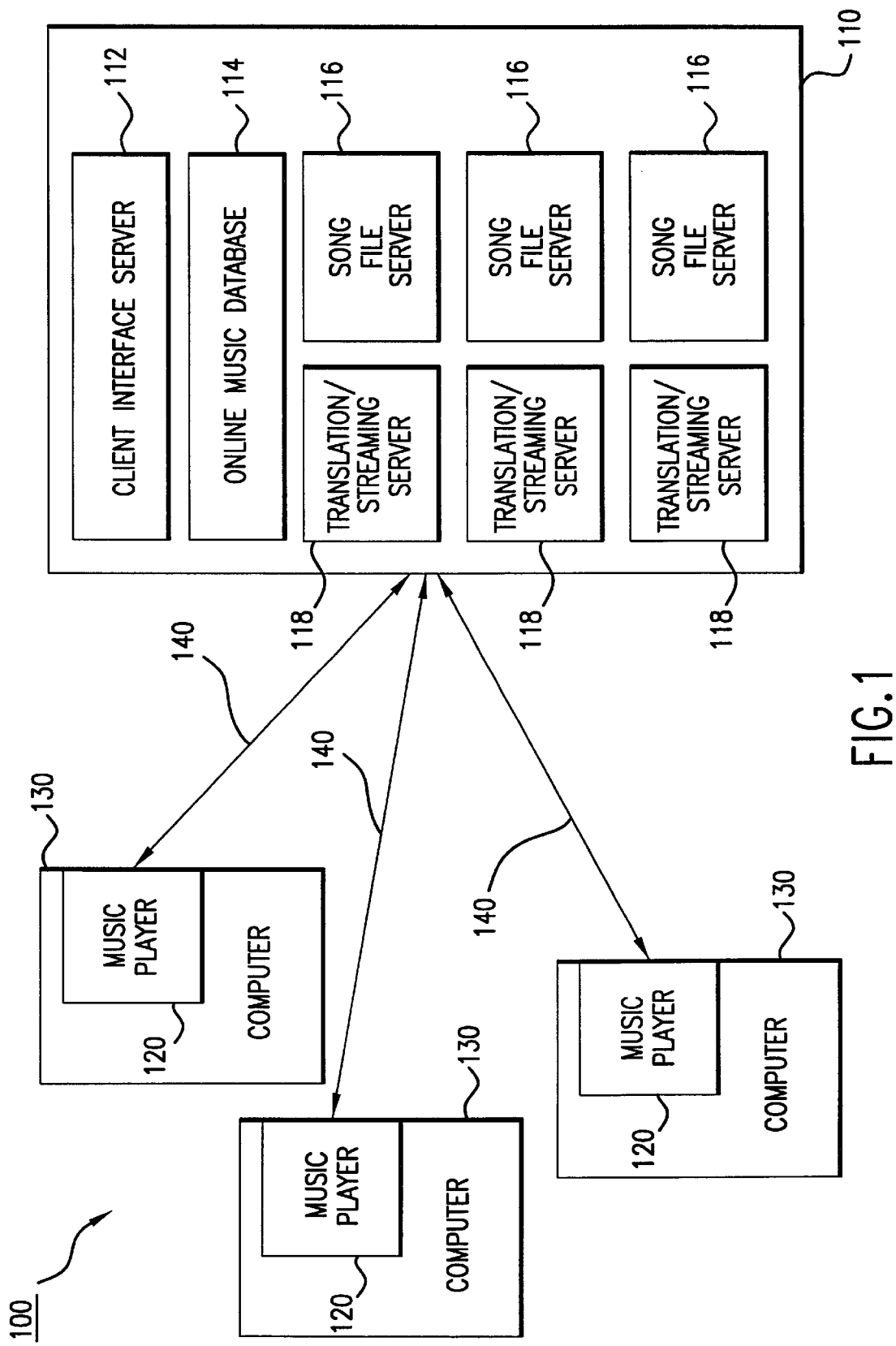
FIG. 1 is a functional block diagram of a preferred embodiment of an online music delivery system.

A preferred embodiment of an online music delivery system 100 is shown in FIG. 1. The online music delivery system 100 may be used by an online music provider to provide an online music service delivering music selections to one or more users. The online music delivery system 100 includes an online music library 110 and one or more music players 120 operating on one or more personal computers 130 connected to the online music library 110 via Internet connections 140.

The online music library 110 preferably consists of a client interface server 112, an online music database 114 of available songs or music selections, a plurality of song file servers 116 and a plurality of translation/streaming servers 118.

The client interface server 112 provides an Internet home page through which a new user may establish a connection with the online music delivery system 100. For example, a new user may register with the online music service and download an installation file for installing a copy of the music player 120 onto the user's computer. Also, the client interface server 112 may allow a user to access the online music database 114 of available music selections. In that case, the client interface server 112 interfaces with the music player 120 for allowing the user to browse or search the online music database 114 and to implement various features of the online music delivery system 100 as described in more detail below.

The online music database 114 lists all of the songs or music selections available through the online music delivery system 100. Preferably, the online music database 114 indexes the music selections to allow users to access music in a variety of ways. For example, in a preferred embodiment, each music selection is indexed by song title, musical artist, album or compact disc (CD) title, one or more corresponding musical genres, and/or year the recording was made.

The song file servers 116 contain all of the song files available through the online music delivery system 100. Preferably, each music selection is stored in an individual song file in a basic, uncompressed raw format. In that case, all translation, compression, and other formatting is performed by the translation/streaming servers 118 as described in more detail below.

The translation/streaming servers 118 provide the interface points for one or more users to access the music selections of the song file servers 116 through the user's music player 120. The translation/streaming servers receive song files in a raw uncompressed format from the song file servers 116, then compress the song files, and stream the compressed song files across the Internet connection 140 to the user's music player 120.

Figure 2:
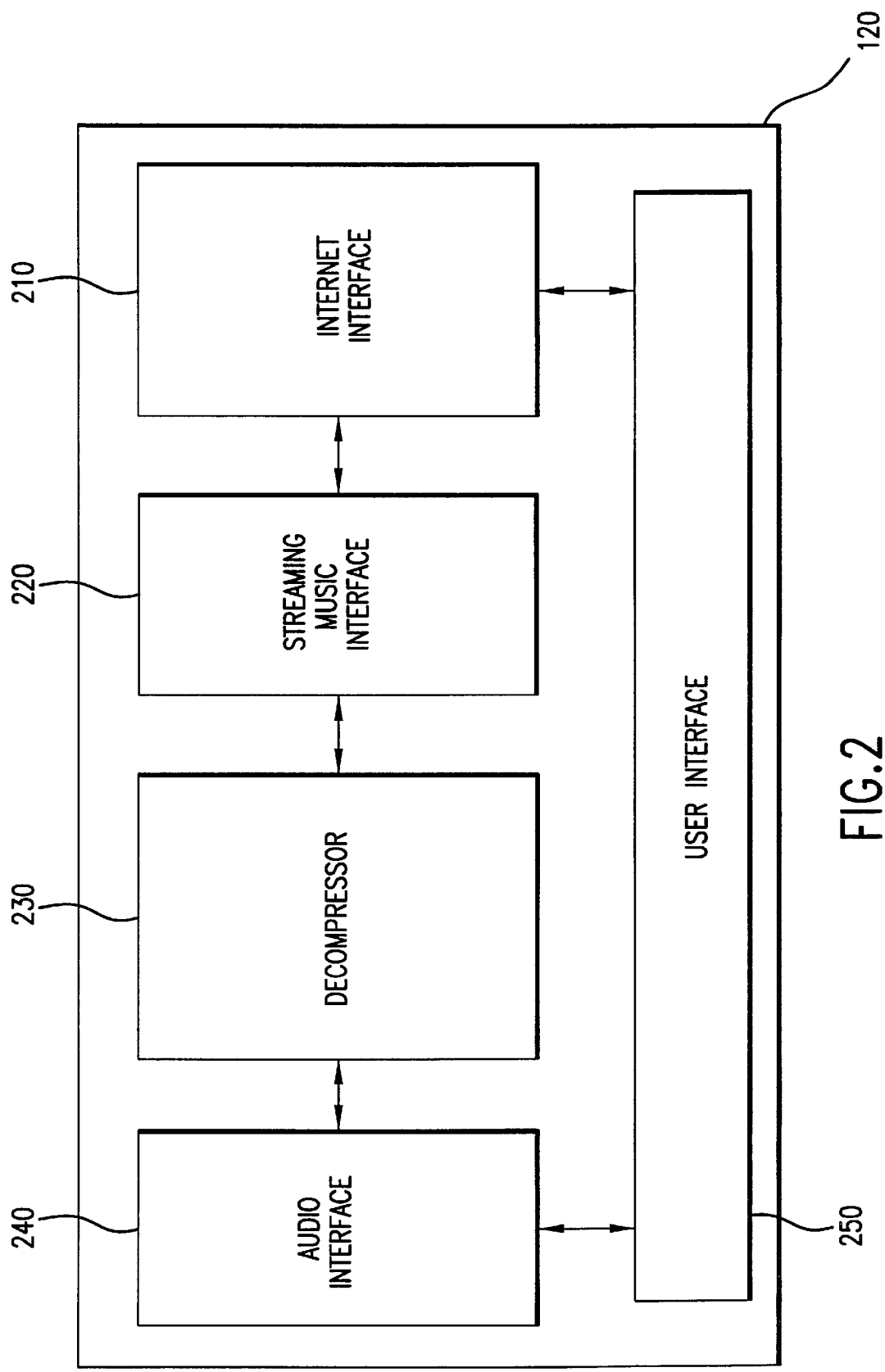
FIG. 2 is a functional block diagram of a music player.

FIG. 2 shows a preferred embodiment of a music player 120. Preferably, the music player 120 is downloaded from the online music library 110 across the Internet connection 140 to a user's computer when the user registers with the online music system 100. The music player 120 has several components, including an Internet interface 210, a streaming music interface 220, a decompressor 230, an audio interface 240, and a user interface 250.

When a user opens or launches the music player 120 which is resident on his or her computer, the Internet interface 210 establishes an Internet connection 140 between the user's computer and the online music library 110. The Internet interface 210 may establish a connection with an online Internet service provider (ISP) through which the Internet interface 210 is connected by a TCP/IP or UDP connection with the online music library 110. Preferably, the Internet interface 210 may include a dial-up dialog box to allow a user to specify his or her protocol, including for example an access number, for establishing an Internet connection 140 through an Internet Service Provider (ISP).

The streaming music interface 220 receives compressed song files as data packets from the Internet interface 210 and formats the data packets into a streaming compressed song file.

The decompressor 230 receives the streaming compressed song file from the streaming audio interface and decompresses the file on-the-fly to provide a song file in a general purpose format playable by the audio processing components of the personal computer.

The audio interface 240 interfaces the decompressed song file from the decompressor 230 to the audio processing components of the personal computer.

Figure 3A:
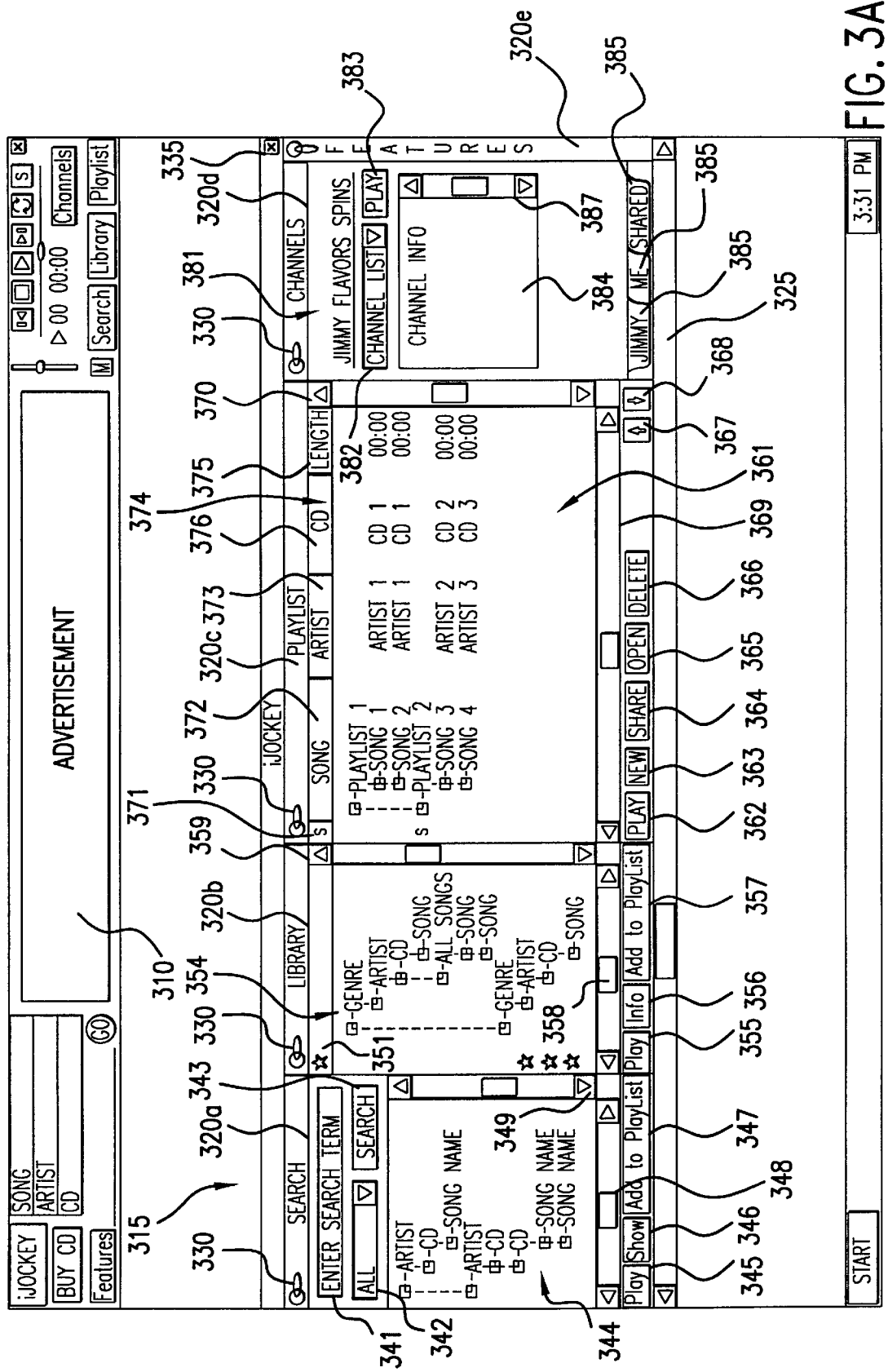
FIGS. 3A–C show a preferred embodiment of a user interface for a music player.
Figure 3B:
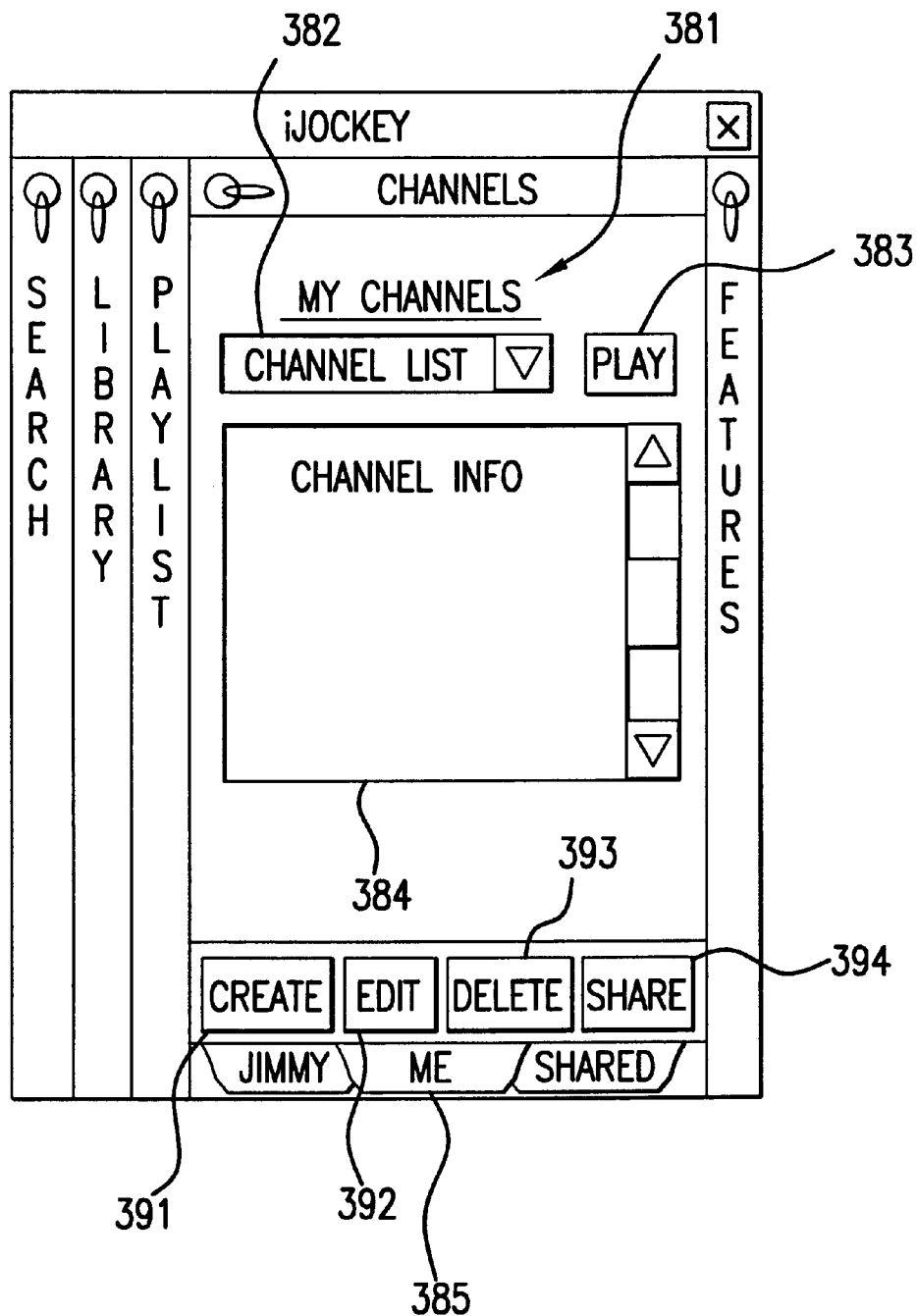
Figure 3C:
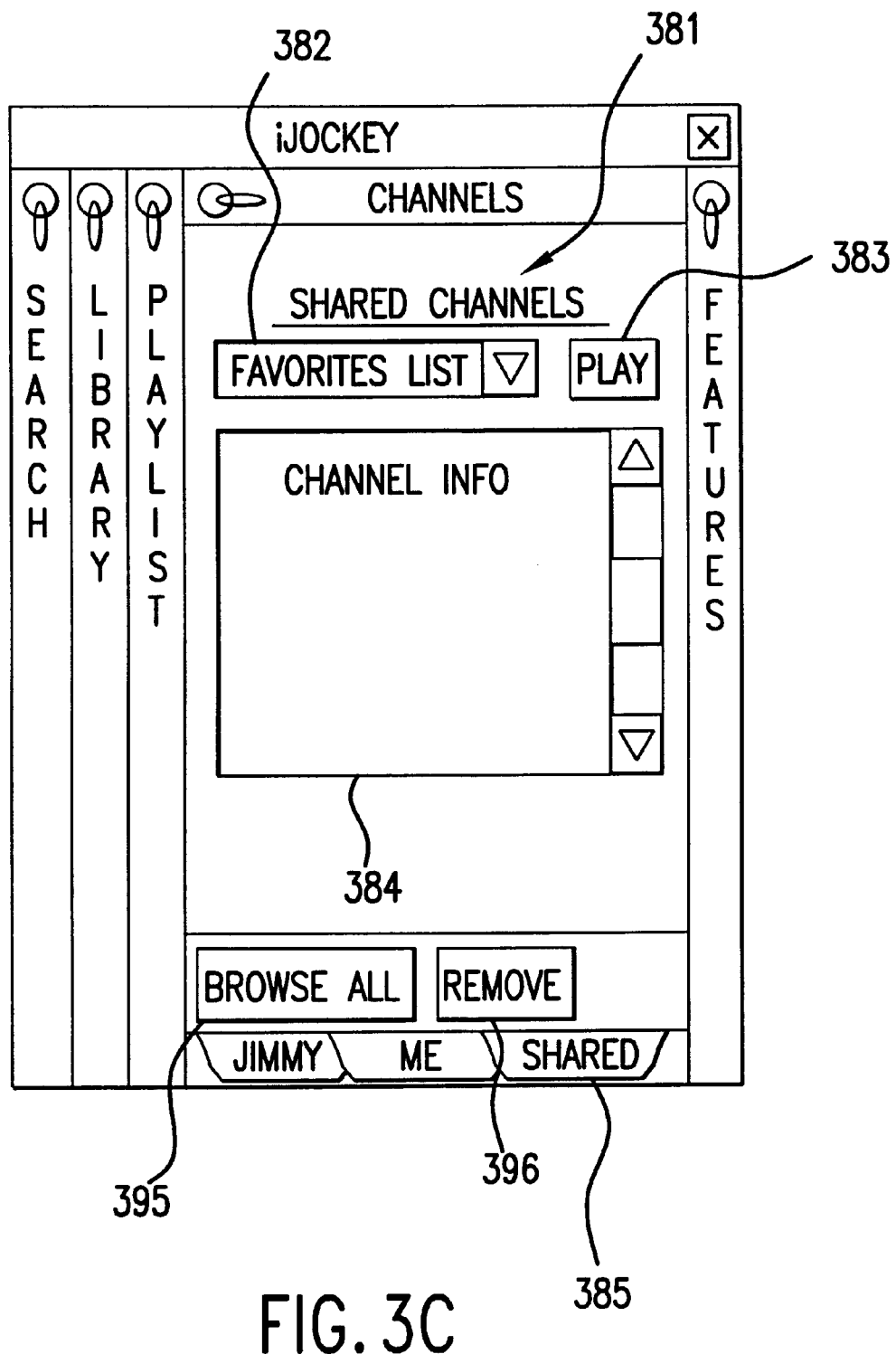

FIGS. 3A–C show a preferred embodiment of a user interface 250 for a music player 120. As shown in FIG. 3A, the user interface 250 includes a player toolbar 310 and an interactive window 315 comprising one or more user interface panes 320, one or more toggles or handles 330 associated with the user interface panes 320, and a close panes box 335.

In one embodiment, the user interface 250 may have a "lego-like" structure, such that a user may rearrange the appearance of various components on the user's computer display screen. For example, the user may grab and drag various panes appearing in the user interface to various areas of the user's computer display screen as desired by the user.

The player toolbar 310 comprises one or more tools allowing a user to interact with aspects of the online music delivery system 100, preferably including user controls for controlling the audio playback of music selections delivered through the online music delivery system 100. Other features of the player toolbar 310 will be described in more detail below with respect to the preferred embodiment shown in FIG. 5.

The user interface panes 320 within the interactive window 315 display various information to the user and allow the user to affect the operation of the music player 120. In a preferred embodiment, the user interface panes 320 include a search pane 320a, a library pane 320b, a playlist pane 320c, a channels pane 320d, and a features pane 320e. The user interface panes 320 may be closed by a user by selecting or "clicking" the close panes box 335.

One or more of the user interface panes 320 may be displayed at a given time, depending upon the state of the associated handles 330. A user interface pane 320 may be displayed or hidden by a user selecting or "clicking" on the associated handle 330. Preferably, when the associated handle 330 is in a first "open" position (i.e., when the lever icon is horizontal) then the corresponding user interface pane 320 is displayed to the user. When the handle is in a second "closed" position (i.e., when the lever icon is vertical) then the corresponding user interface pane 320 is minimized. Further details regarding the operation of the handles 330 and the display of the user interface panes 320 will be described below with respect to FIG. 5.

In a preferred embodiment, the search pane 320a includes a search terms entry box 341, a search parameter selection box 342, a search button 343, a search results display subpane 344, a play button 345, a show selection button 346, an add button 347, and horizontal and vertical scrollbars 348, 349.

The search pane 320a provides an interface with the client interface server 112 for allowing the user to browse or search the online music database 114 to locate a particular music selection which may be referenced by song title, artist, album or CD title, musical genre, etc. When the user wants to locate one or more music selections in the online music database 114, he or she enters the search criteria into the search terms entry box 341 and selects a search category through the search parameter selection box 342. Search criteria generally consist of keywords in a song's title, an artist's name, etc. Search parameters may include, for example, the song title, CD title, recording artist, or all of these parameters. The user activates the search by pressing, selecting or "clicking" on the search button 343, through depressing a mouse button, for example.

When the search button 343 is selected, the music player 120 communicates a search request across the Internet connection 140 to the online music library 110. The online music library 110 performs a search of the online music database 114 and returns search results across the Internet connection 140 to the music player 120. All music selections which satisfy the search criteria are displayed in the search results display subpane 344.

In a preferred embodiment, the search parameter selection box 342 includes an Internet search category for searching the Internet for song files. When the user selects the Internet search category and activates the search button 343, the music player 120 communicates a search request across the Internet connection 140 to the online music library 110. In that case, the online music library 110 includes or is linked to an Internet search engine which performs a search of the Internet for song files matching the search criteria. The online music library 110 returns the search results across the Internet connection 140 to the music player 120. All song files which are found by the search engine which the satisfy the search criteria are displayed in the search results display subpane 344.

At that point, the user may highlight a music selection in the search results display subpane 344 and select the play button 345. If the user selects the play button 345, then the music player 120 will transmit a request to the online music library 110 to begin streaming the corresponding compressed song file immediately across the Internet to the music player 120. Upon receiving the compressed streaming song file, the music player 120 will decompress the song file and play the music selection back through the user's computer.

Advantageously, in this way a listener may select any music selection available and play it at once, without any reference to any other music selections which are currently playing or which have previously been requested. That is, by searching for and playing music selections in an online music delivery system 100 according to the present invention, a listener is provided the total flexibility to select any songs from the music database to be played in any order as desired by the user.

Alternatively, if the user highlights one or more music selections in the search results display subpane 344 and selects the add button 347, then the highlighted music selection(s) may be added to a playlist of music selections to be delivered to the user's music player 120. At this point, the playlist pane 320c is opened (if it was closed) and the user selects a playlist to which the highlighted music selection(s) will be added, as described in more detail below.

Advantageously, in this way a listener may select any music selections available via the online music delivery system 100 and add them to one or more playlists in any order, without any reference to any other music selections which are already included in the playlist. That is, a listener or user is provided the total flexibility to select a list of any songs, or entire compact disc recordings, from the music database to be played in any order as desired by the listener.

If the user highlights a music selection in the search results display subpane 344 and selects the show selection button 346, then the library pane 320b opens (if it was closed), displaying the highlighted music selection.

In a preferred embodiment, the library pane 320b includes a favorites button 351, a database display subpane 354, a play button 355, an information button 356, an add button 357, and horizontal and vertical scrollbars 358, 359. Via the database display subpane 354, the library pane 320b provides a hierarchical view into the online music database 114.

In a preferred embodiment, at a topmost hierarchical level a list of musical genres is provided in the database display subpane 354, for example, classical music, country music, show tunes, rock music, jazz music, etc. A list of subgenres may also be provided at a next topmost hierarchical level, for example, within the rock music genre, there may be several subgenres, such as oldies rock, classic rock, heavy metal, grunge rock, etc. At successive lower hierarchical levels, music selections may be classified by recording artist, CD or album title, and song title. A user may select or "click" on an expansion box to view or hide various hierarchical levels.

Upon browsing the online musical database 114 and locating one or more music selections of interest, a user may mark the music selection(s) for more easy retrieval in the future. In a preferred embodiment, the library pane 320b includes a favorites button 351 indicating the location of particular music selections which have been previously marked by the user.

In a preferred embodiment, the database display subpane 354 also shows a directory structure for one or more mass storage devices associated with the user's computer. Thus, the user may view and select one or more song files stored on the mass storage devices. Preferably, the music player 120 can retrieve and play music selections stored onto a mass storage device in a variety of compressed audio formats, such as MP3, REAL AUDIO®, LIQUID AUDIO™ etc. Also, the music player 120 may retrieve and play music selections stored on a compact disc, or downloaded onto a hard disk drive of a user's computer, in an uncompressed audio format.

Upon one or more music selections being displayed in the database display subpane 354, the user may highlight a music selection and select the play button 355. If the highlighted music selection is stored on a mass storage device of the user's personal computer, then the music player 120 will retrieve and play the music selection. However, if the highlighted music selection is stored in the online music library 110, then the music player 120 will transmit a request across the Internet 140 to the online music library 110 to begin streaming the corresponding compressed song file immediately across the Internet to the music player 120. Upon receiving the compressed streaming song file, the music player 120 will decompress the song file and play the music selection back through the user's computer.

Advantageously, a listener may select any music selection available in the online music delivery system 100 and play it immediately, without any reference to any other music selections which are currently playing or which have previously been requested. That is, by browsing for and playing music selections in this way, a listener is provided the total flexibility to select any songs from the online music database 114 to be played in any order as desired by the listener.

Alternatively, if the user highlights one or more music selections in the database display subpane 354 and selects the add button 357, then the highlighted music selection(s) may be added to a playlist of music selections to be delivered to the user's music player 120. At this point, the playlist pane 320c opens and the user selects a playlist to which the highlighted music selection(s) will be added, as described in more detail below.

Advantageously, a listener may browse and select any music selections available and add them to one or more playlists in any order, without any reference to any other music selections which are already included in the playlist. That is, a listener is provided the total flexibility to select a list of any songs from the online music database 114 to be played in any order as desired by the listener.

If the user highlights a music selection in the database display subpane 354 and selects the info button 356, then a dialog box appears on the computer display screen providing more information about the highlighted item. For example, if the highlighted item is a song title, the dialog box may reveal the song length, the year it was recorded, and/or other information of interest.

In a preferred embodiment, the playlist pane 320c includes a playlist display subpane 361, a play button 362, a new button 363, a share button 364, and open button 365, a delete button 366, up and down buttons 367, 368, and horizontal and vertical scrollbars 369, 370. The playlist pane 320c displays a list of all playlists which the user has saved, together with the music selections included in each playlist. The user may create, open, edit, delete, share, and play playlists via the playlist pane 320c.

The playlist display subpane 361 includes a shared column 371, a playlist column 372, and artist column 373, a CD column 374, and a length column 375. The widths of each column in the playlist display pane 361 can be adjusted by dragging the corresponding column separator bar 376. The playlist column 371 provides a hierarchical listing of all playlists which the user has saved. The upper hierarchical level includes a name for the playlist, and the lower hierarchical level includes a song title for each music selection included in the playlist. The music selections are shown in the order in which they will be played in the playlist, with the first music selection at the top and the last music selection at the bottom. For each music selection in the playlist, the artist column 373 provides the name of the recording artist, the CD column 374 provides the title of the CD or album which includes the music selection, and the length column 375 provides the time required for the music selection to play.

A user may add songs to a playlist through the search pane 320a or the library pane 320b as described above. Preferably, the user may reorder the music selection within a playlist by either highlighting a music selection in the playlist display subpane 361 and dragging it to its desired location within the playlist, or by using the up and down buttons 367, 368 to move the highlighted music selection up or down one place at a time. Preferably, the user may delete a music selection from a playlist by highlighting it in the playlist display subpane 361 and selecting the delete button 366.

The user may play a highlighted playlist by selecting the play button 361. Alternatively, in an optional embodiment, when the play button is selected the user may be given the choice to play the highlighted playlist immediately, to schedule a time for the playlist to be played in the future, or to create a queue of playlists to be played sequentially.

By creating and playing playlists of music selections in this way, a listener is provided the total flexibility to select any music selections from the online music database 114 to be played in any order as desired by the listener. In particular, a listener may create and play playlists consisting of an entire CD by one artist, or even several CDs from a same artist, played consecutively.

The user may create a new playlist by selecting the new button 363. In that case, a dialog box is opened on the computer display screen and the user may enter a name for the new playlist. The user may delete a playlist by highlighting it in the playlist display subpane 361 and selecting the delete button 366.

The user may also share a playlist by selecting the share button 364. A shared playlist is a playlist which is stored at the online music library 110 and is accessible to all registered users of the online music system 100. When the user elects to share a playlist by selecting the share button, a dialog box is opened on the computer display screen for the user to provide information about the playlist to be shared, such as the user's name or alias, the total playtime, musical theme, etc. When the user closes the dialog box, the music player 120 transmits the information together with the playlist across the Internet connection 140 to the online music library 110. The shared column 371 of the playlist display subpane 361 indicates whether or not a playlist is shared.

A user may open and save a shared playlist by pressing the open button 365. When the open button 365 is pressed, the music player 120 sends a request across the Internet connection 140 to the online music library 110 for all playlists which may be downloaded from the online music library 110. Then, a new window is opened on the computer display screen showing the shared playlists available from the online music library 110. At this point, the user may highlight a shared playlist to see the music selections included in the playlist. The user can save a shared playlist by selecting the new button 363, or can play a shared playlist by selecting the play button 362.

In a preferred embodiment, the channels pane 320d includes a channel title subpane 381, a channel selection box 382, a play button 383, a channel display subpane 384, two or more channel category tabs 385, a horizontal scrollbar (not shown), and a vertical scrollbar 387. Channels are analogous to radio stations, providing a continuous stream of music selections from the online music service system 100. For each channel, music selections are played from a very long carousel. Although one or more music selections may repeat more frequently, the length of the total play cycle may be several days or longer. Moreover, in some cases music selections matching certain target criteria for a channel may be randomly selected and played in a channel.

In a preferred embodiment, the online music system 100 includes three different types of channels, namely, preprogrammed channels, user-defined channels, and shared channels. Preprogrammed channels are channels which are programmed by the online music provider to fit popular musical formats such as might exist on conventional broadcast radio. Music selections may be continuously added or removed from each preprogrammed channel. Whenever a user "tunes" to a preprogrammed channel, the user hears the music already in progress, much as if he or she tuned to a radio station. User-defined channels are created in response to a user's particular musical preferences. Preferably, the online music system 100 automatically creates user-defined channels in response to information provided by a user. Shared channels are channels of music delivered to a user which were created and then shared in response to particular musical preferences supplied by one or more other users. Channels will be described in more detail below.

When the preprogrammed channel category tab 385 is selected, the channel title subpane 381 includes a title (e.g., "Jimmy Flavors Spins") indicating that the preprogrammed channel category is active. A list of all preprogrammed channels appears in the channel selection box 382. Information about the channel currently selected in the channel selection box 382 appears in the channel display subpane 384. If a user highlights a channel then selects the play button 383, then the music player 120 will send a request across the Internet connection 140 to the online music library 110 to begin immediately streaming the selected channel to the user's computer. The selected preprogrammed channel is played "in progress" as with a conventional broadcast radio program.

As shown in FIG. 3B, when the user-defined channel category tab 385 is selected, the channel title subpane 381 includes a title indicating that the user-defined channel category is active (e.g., "My Channels"). A list of all user-defined channels appears in the channel selection box 382. Information about the user-defined channel currently selected in the channel selection box 382 appears in the channel display subpane 384. If a user highlights a user-defined channel then selects the play button 383, then the music player 120 will send a request across the Internet connection 140 to the online music database 114 to begin immediately streaming the selected user-defined channel to the user's computer.

As shown in FIG. 3B, when the user-defined channel category tab 385 is selected, the channel title subpane 381 includes four additional buttons: a create button 391, an edit button 392, a delete button 393 and a share button 394.

A user may create a new user-defined channel by selecting the create button 391. When the user selects the create button 391, a dialog box is opened on the computer display screen for the user to enter his or her musical preferences for the channel, together with a channel name. The musical preferences are used to create parameters for the online music system 100 to automatically program the user-defined channel.

A user may edit an existing user-defined channel by selecting the edit button 392. When the user highlights a user-defined channel and selects the edit button 392, a dialog box is opened on the computer display screen showing the user-defined channel name and the musical preferences for the user-defined channel. The user may edit those preferences to change the musical format of the user-defined channel.

A user may delete a user-defined channel by selecting the delete button 393. When the user highlights a user-defined channel and selects the delete button 393, the highlighted channel is deleted from the user-defined channel list.

A user may share a user-defined channel by selecting the share button 394. A shared channel is a user-defined channel whose parameters are stored at the online music library 110 and which is accessible to all registered users of the online music system 100. When the user elects to share a channel, a dialog box is opened on the computer display screen for the user to provide information about the channel to be shared, such as a channel name, the user's name or alias, musical theme, etc. When the user closes the dialog box, the music player 120 transmits the information together with the channel parameters across the Internet connection 140 to the online music library 110.

As shown in FIG. 3C, when the shared channel category tab 385 is selected, the channel title subpane 381 includes a title indicating that the shared channel category is active. A list of a user's preselected favorite shared channels appears in the channel selection box 382. Information about the shared channel currently selected in the channel selection box 382 appears in the channel display subpane 384. If a user highlights a shared channel then selects the play button 383, then the music player 120 will send a request to the online music database 114 to begin immediately streaming the selected shared channel to the user's computer. If the shared channel is active, i.e., another user is already listening to the shared channel, then the selected channel begins "in progress" as with a conventional broadcast radio program. If no other users are currently listening to the shared channel, then the selected channel begins at the start of its musical rotation.

Preferably, when a channel is being streamed to a user, the user may mark a music selection that is currently playing from the channel as a favorite to be accessed through the library pane 320b. Also, the user may add a music selection that is currently playing from the channel to a playlist in the playlist pane 320c.

As shown in FIG. 3C, when the shared channel category tab 385 is selected, the channel title subpane 381 includes two additional buttons: a browse button 395 and a remove button 396. A user may add a shared channel to the favorite shared channels in the channel selection box 382 by selecting the browse all button 395. When the user selects the browse all button 395, a dialog box is opened on the computer display screen, listing all of the shared channels available through the online music system 100. The user may highlight one or more shared channels and add them to the favorite shared channels. Conversely, when the user highlights a shared channel in the channel selection box 382 and selects the remove button 396, the highlighted shared channel is removed from the favorite shared channels.

The features pane 320e preferably includes buttons which a user may select to implement a variety of special features of the online music delivery system 100. For example, the features pane 320e preferably includes a "chat" button to allow a user to connect to one or more chat rooms hosted by the online music library 110. The chat rooms may allow users listening to a same channel to discuss what they are hearing in real time. In that case, each preprogrammed channel may have an associated chat room. Shared channels may also have a chat room if so specified by the channel's originator.

The features pane 320e preferably includes a "skins" button to allow a user to create, or select a precreated, "skin" or custom appearance template for the user interface 250 of the music player 120. By changing skins, a user can customize the size, shape, color, or other appearance features of the panes, handles, and buttons of the user interface 250.

The features pane 320e preferably includes an "instant messaging" button for a user to send an instant message via the Internet to one or more users currently connected with the online music delivery system 100. Preferably, the user may have a predefined list of users with which he or she may exchange instant messages.

The features pane 320e preferably includes a "ratings" button to allow a user to rate a music selection and/or to view the ratings of other users regarding music selections in the online music database 114.

The features pane 320e preferably includes a "pay-per-listen" button to allow a user to order special pay-per-listen events, such as new recording releases, concerts, etc. When the user selects the "pay-per-listen" button, a dialog box is opened on the computer display screen listing upcoming "pay-per-listen" events and allowing the user to purchase one or more of these events.

As can be seen, numerous user interface panes 320 exist within the interactive window 315 and may be opened on the computer display screen. If too many user interface panes 320 are opened, then the interactive window 315 cannot fit onto the user's computer display screen. In that case, a horizontal scroll bar 325 appears in the interactive window 315 below the user interface panes 320 to allow the user to scroll across the interactive window 315. Moreover, a user may not only open and close the user interface panes 320 with the handles 330, but may also resize each user interface pane 320.

Figure 4A:
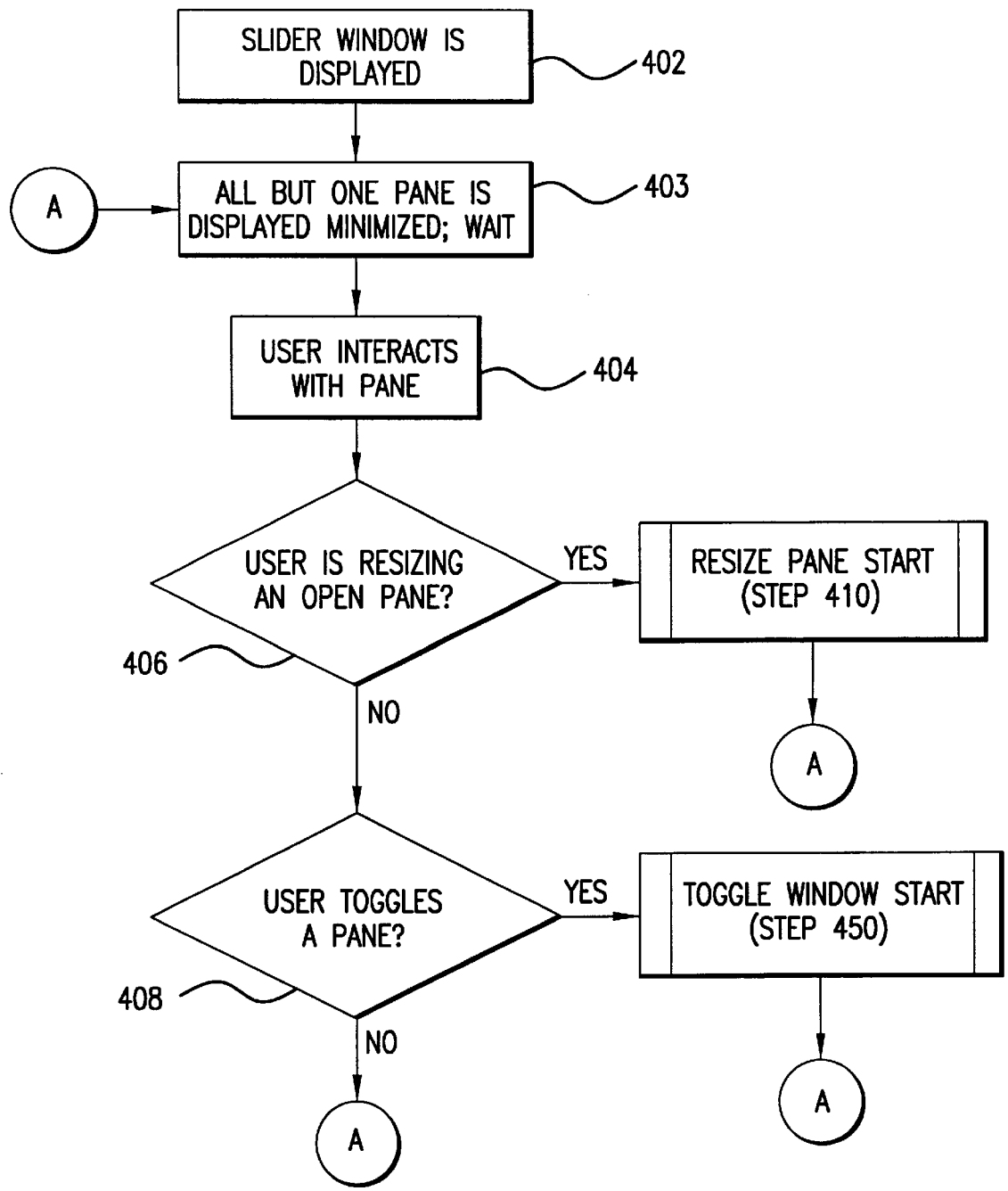
FIGS. 4A–C are a flowchart of a process of opening, closing, sizing and resizing user interface panes in a user interface of a music player.
Figure 4B:
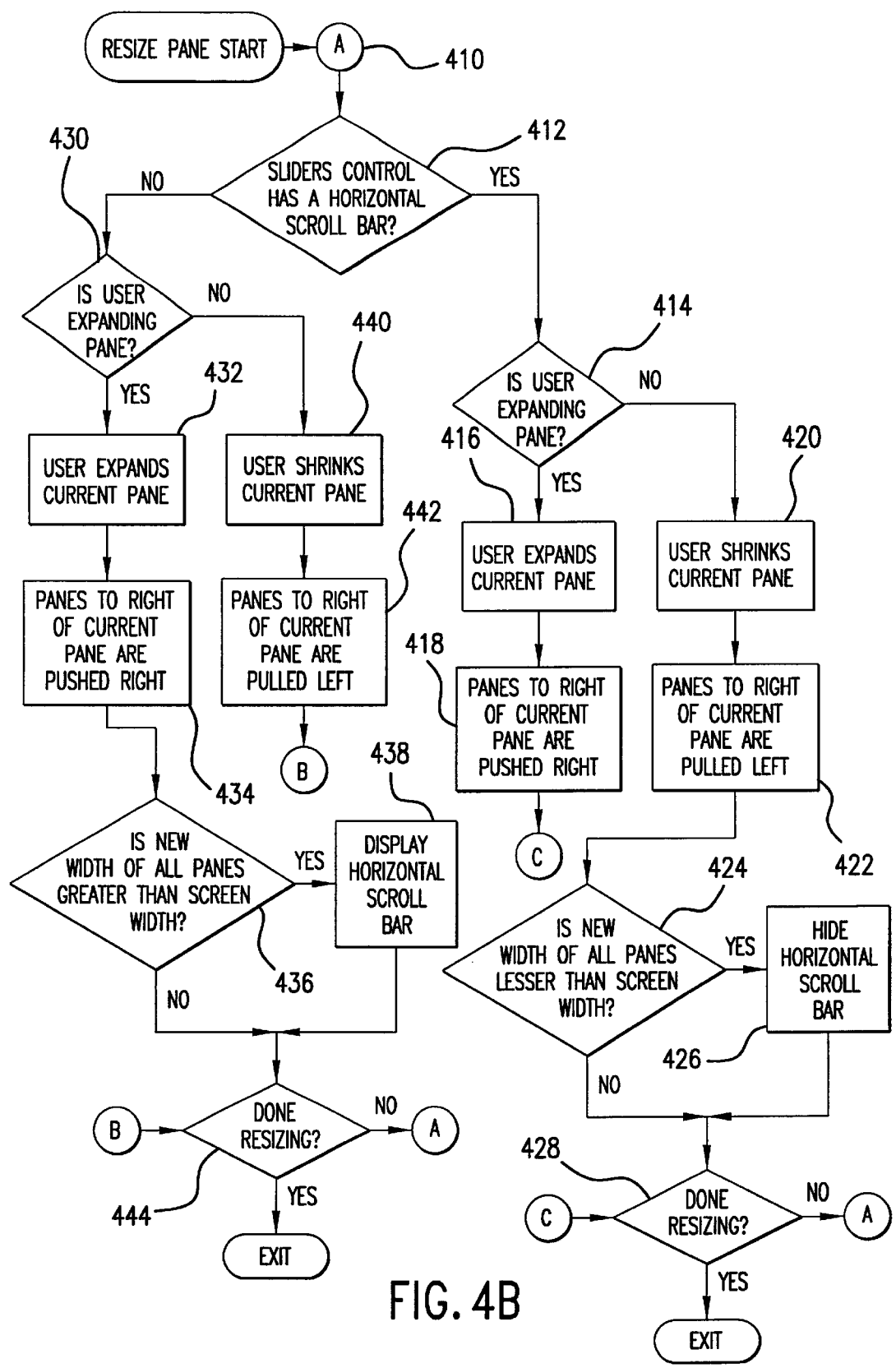
Figure 4C:
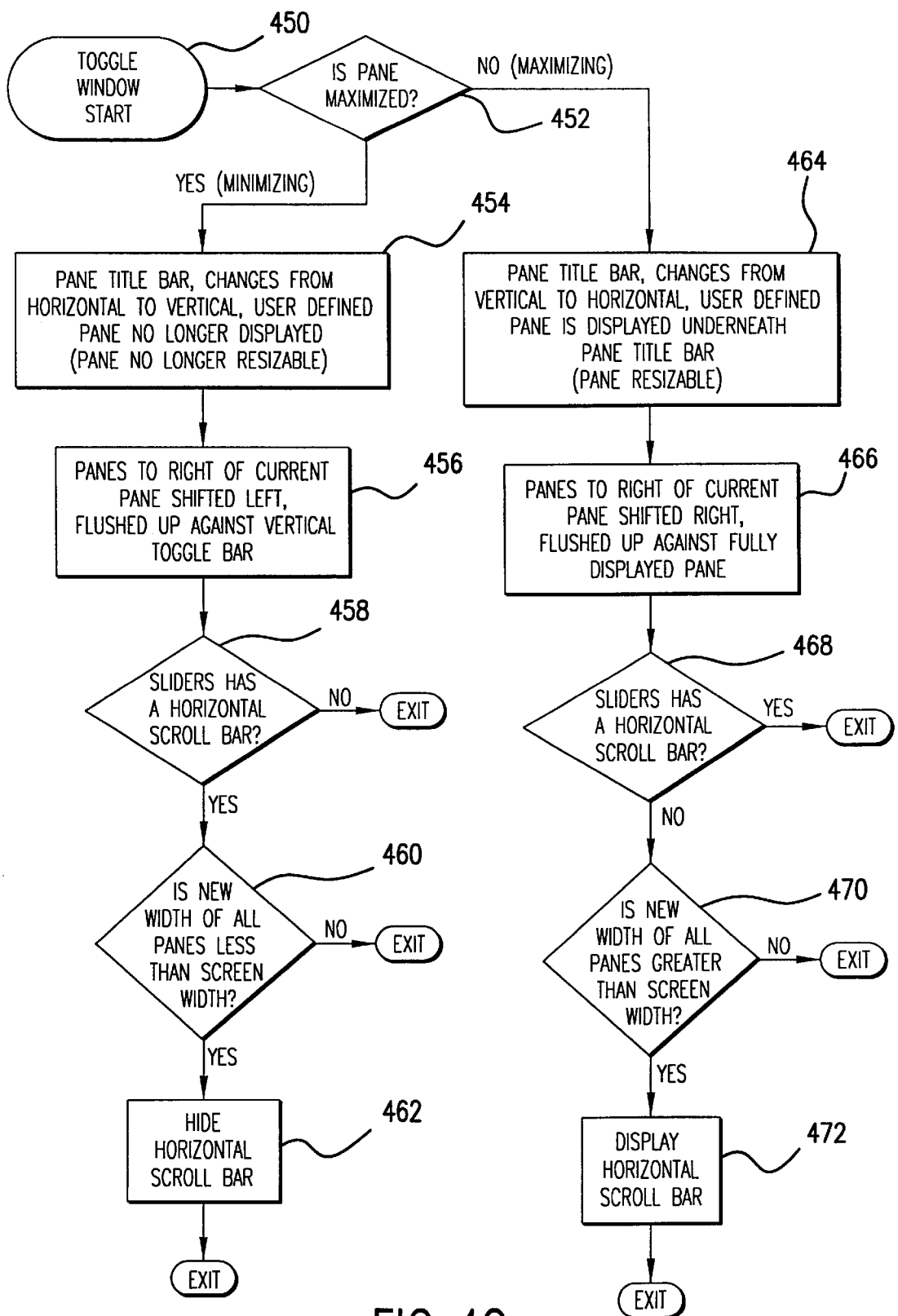

FIGS. 4A–C show a flowchart of a preferred embodiment of a process which may be executed by a pane management computer program for opening, closing, sizing and resizing the display areas of the user interface panes 320 in the interactive window 315 for display on a computer display screen.

In a first step 402, an interactive window 315 is displayed. At that time, all but one user interface pane 320 are minimized. Then, in a step 403, the pane management program waits for user interaction.

Then, in a step 404, a user interacts with a user interface pane 320. In a step 406, the pane management program determines if the user is resizing the user interface pane 320. If so, then the pane management program executes a resize pane routine at a step 410. If not, then in a step 408, the pane management program determines if the user is toggling (opening or closing) the user interface pane 320. If so, then the pane management program executes a toggle pane routine at a step 450. If not, then the pane management program returns to the step 403.

The resize pane routine begins at the step 410 as shown in FIG. 4B. In a next step 412, the pane management program determines if the interactive window 315 includes a horizontal scroll bar 325.

If the interactive window 315 includes a horizontal scroll bar 325, then in a step 414, the pane management program determines if the user is expanding the user interface pane 320. If the user is expanding the user interface pane 320, then in a step 416 the pane management program allows the user to expand the current user interface pane 320. Then, in a step 418, all of the user interface panes 320 to the right of the user interface pane 320 the user is expanding are pushed to the right. Then the pane management program proceeds to a step 428.

If interactive window 315 includes a horizontal scroll bar 325 and if the user is not expanding the user interface pane 320, then in a step 420 the pane management program allows the user to shrink the current user interface pane 320. Then, in a step 422, all of the user interface panes 320 to the right of the user interface pane 320 the user is expanding are pulled to the left. Then, in a step 424, the pane management program determines if the new width of all of the user interface panes 320 is less than the computer display screen width. If not, then the pane management program proceeds to the step 428. If so, then the pane management program hides the horizontal scroll bar 325 in a step 426 before proceeding to the step 428.

In the step 428, the pane management program determines if the user is done resizing the user interface pane 320. If not, then the pane management program returns to the step 410. If so, then the pane management program exits the resize pane routine and returns to the step 403.

If in the step 412 the pane management program determines that interactive window 315 does not include a horizontal scroll bar 325, then in a step 430 the pane management program determines if the user is expanding the user interface pane 320. If the user is expanding the user interface pane 320, then in a step 432 the pane management program allows the user to expand the current user interface pane 320. Then, in a step 434, all of the user interface panes 320 to the right of the user interface pane 320 the user is expanding are pushed to the right. Then, in a step 436, the pane management program determines if the new width of all of the user interface panes 320 is greater than the computer display screen width. If not, then the pane management program proceeds to the step 444. If so, then the pane management program hides the horizontal scroll bar 325 in a step 438 before proceeding to the step 444.

If the interactive window 315 does not include a horizontal scroll bar 325 and if the user is not expanding the user interface pane 320, then in a step 440 the pane management program allows the user to shrink the current user interface pane 320. Then, in a step 442, all of the user interface panes 320 to the right of the user interface pane 320 the user is expanding are pulled to the left. Then the pane management program proceeds to a step 444.

In the step 444, the pane management program determines if the user is done resizing the user interface pane 320. If not, then the pane management program returns to the step 410. If so, then the pane management program exits the resize pane routine and returns to the step 403.

The toggle pane routine begins at the step 450. In a next step 452, the pane management program determines if the user interface pane 320 is maximized.

If the user interface pane 320 is maximized, then in a step 454 the user interface pane 320 title bar changes from horizontal to vertical and the user interface pane 320 is no longer displayed. Then, in a step 456, user interface panes 320 to the right of the current user interface pane 320 are shifted to the left against the vertical toggle bar or handle.

Next, in a step 458, the pane management program determines if the interactive window 315 includes a horizontal scroll bar 325. If not, then the pane management program exits the toggle pane routine and returns to the step 403. If so, then the pane management program proceeds to a step 460 where it determines if the width of all of the user interface panes 320 is less than the computer display screen width. If the width of all of the user interface panes 320 is not less than the computer display screen width, then the pane management program exits the toggle pane routine and returns to the step 403. If the width of all of the user interface panes 320 is less than the computer display screen width, then the pane management program proceeds to a step 462 wherein it hides the horizontal scroll bar 325 and then exits the toggle pane routine and returns to the step 403.

If in the step 452, the pane management program determines that the user interface pane 320 is not maximized, then in a step 464 the user interface pane 320 title bar changes from vertical to horizontal and the user interface pane 320 is displayed underneath the user interface pane 320 title bar. Then, in a step 466, user interface panes 320 to the right of the current user interface pane 320 are shifted to the right.

Next, in a step 468, the pane management program determines if the user interface panes 320 include a horizontal scroll bar 325. If so, then the pane management program exits the toggle pane routine and returns to the step 403. If not, then the pane management program proceeds to a step 470 where it determines if the width of all of the user interface panes 320 is greater than the computer display screen width. If the width of all of the user interface panes 320 is not greater than the computer display screen width, then the pane management program exits the toggle pane routine and returns to the step 403. If the width of all of the user interface panes 320 is greater than the computer display screen width, then the pane management program proceeds to a step 472 wherein it displays the horizontal scroll bar 325 and then exits the toggle pane routine and returns to the step 403.

Figure 5:
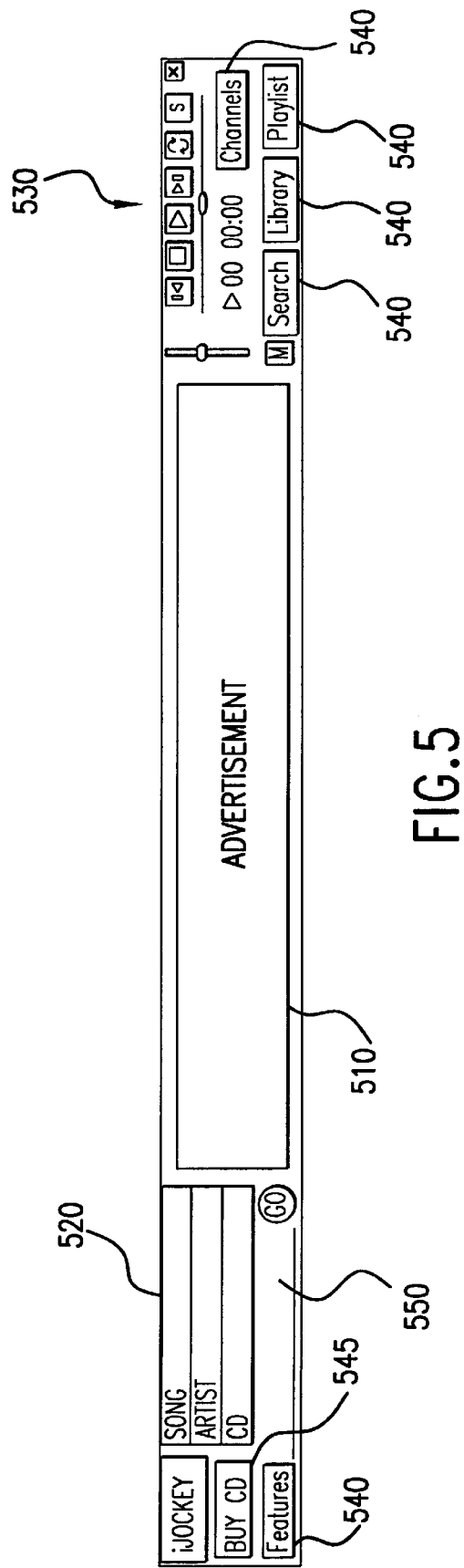
FIG. 5 is a player toolbar for a music player.

FIG. 5 shows a preferred embodiment of a player toolbar 310 in the interactive window 315 of the music player 120. The player toolbar comprises an advertisement component of the user interface 250, as will be described in more detail below.

In a preferred embodiment, the player toolbar 310 is an application desktop toolbar according to the WINDOWS® operating system. In that case, the player toolbar 310 is automatically set to be a topmost desktop toolbar which remains on a user's computer display screen at all times regardless of other applications which may be open on the user's computer desktop. In other words, the player toolbar 310 is automatically set to be a topmost desktop toolbar on a z-order (z-axis) stack of desktop toolbars or windows on the display screen. Also, the player toolbar occupies a topmost or bottommost position (y-axis) on the user's computer display screen. All other open windows on the user's computer display screen are then "resized," or pushed up or down, to fit within in the remaining available display area on the user's computer display screen.

Minimally, the player toolbar 310 comprises at least one pane for displaying an advertisement or other information to a user, and one or more player controls. In a preferred embodiment, the player toolbar 310 includes an advertisement pane 510, an information pane 520, a player control pane 530, and several user interface buttons 540.

The advertisement pane 510 includes and displays advertisements. Preferably, the advertisements are delivered across the Internet from the online music library 110 to the music player 120. The advertisements may be simple "banner ads" or may include picture images, animations, video, audio, or any combination thereof. Preferably, each advertisement had a display duration (e.g., 15 seconds, 30 seconds, etc.) after which it is replaced by a next advertisement. An advertisement display duration may be matched to the duration of a particular music selection which is played by the music player 120.

The advertisements may be targeted to a user or group of users, depending upon the music selections they choose to hear, and/or some combination of user demographics. Demographic information may be obtained from users when they subscribe to the online music delivery service. In a preferred embodiment, the advertisements may include tie-ins to particular music selections being played by the music player 120. These may include concert tickets, albums, T-shirts, or other items associated with a particular artist whose music selection is being played. In that case, a user may "click" on an advertisement to open a web browser window where he or she may purchase an advertised product over the Internet.

The information pane 520 preferably includes information about a music selection currently being delivered to the user's computer via the online music delivery system 100. The information may include a song title, an artist name, a CD or album title, etc.

The player control pane 530 preferably includes several player controls for music selections being played by the music player 120. Preferably, the player controls include a play button, a stop button, a previous song button, a next song button, a repeat button, a shuffle button for randomly playing songs, a volume control bar, a balance control bar, an elapsed time/remaining time counter, an elapsed time bar, and an equalizer.

In a preferred embodiment, the player toolbar 310 includes several user interface buttons 540, such as a search button, a library button, a playlist button, a channels button and a features button. If a user selects any of these user interface buttons 540, the corresponding user interface pane 320 is opened and displayed on the computer display screen in the interactive window 315.

Preferably, the player toolbar 310 includes a purchase button 545 to allow a user to purchase a CD or album which includes the music selection which is being played by the music player 120. Additionally, the user may purchase a downloadable copy of a music selection by selecting the purchase button 545 while the music selection is being streamed to the user's computer.

Also, preferably, the player toolbar 310 includes an Internet search button 550 for allowing a user to perform an Internet keyword search. In that case, the online music delivery system 100 may include an Internet search engine for searching the Internet for web sites matching a user's selected keywords. Alternatively, the Internet search button 550 may provide a link to another Internet web site featuring an Internet search engine. In another alternative embodiment, the search button 550 may search directly into the online music database 114.

In a preferred embodiment, the music player 120 operates on a computer with an operating system having a graphical user interface, for example the MACINTOSH® operating system or the WINDOWS® operating system. As is well known, in such an operating system a number of computer programs or applications may have user interfaces which are simultaneously displayed in separate windows on the computer display screen. When two or more windows are open, they may typically be resized to various sizes desired by the user. Also, a first window may be placed over a second window, thus covering or hiding some or all of the second window such that its contents are not displayed on the computer display screen and are therefore not visible to a computer user.

Advantageously, the player toolbar 310 and its associated advertisement pane 510 automatically remain visible on a user's computer display screen whenever the music player 120 is open and executing on the computer. There is no user control provided in the user interface 250 for a user to minimize or hide the player toolbar 310 on the computer display screen.

In an alternative embodiment, an advertisement component of the user interface 250 may comprise a "floating window" instead of the player toolbar 310. In that case, a floating window remains visible on a user's computer display screen whenever the music player 120 is open. Unlike an application desktop toolbar, the floating window may be moved by a user to any position on the user's computer display screen, not just the topmost or bottommost position (y-axis) of the user's computer display screen. Also, unlike an application desktop toolbar, the floating window does not "resize" the screen for all other open windows. The floating window may therefore cover portions of other windows open on the user's computer display screen. Nevertheless, like the player toolbar, the floating window is automatically set to remain on a topmost z-order (z-axis) stack of windows displayed on the user's computer display screen, and cannot be minimized by a user or moved off of the user's computer display screen. There is no user control provided in the user interface 250 for a user to minimize or hide the floating window on the computer display screen.

Thus, the advertisement component of the user interface 250 insures that the advertisements always appear on the user's computer display screen as long as the music player 120 is open. This ensures that advertisements are always visible to a user while using the online music service. This in turn makes the advertisements more effective and valuable to advertisers, generating higher advertisement rates. The increased advertisement revenues allow the online music service provider sufficient revenue to procure rights to transmit music selections from many artists, to be played in any order desired by a user.

Figure 6A:
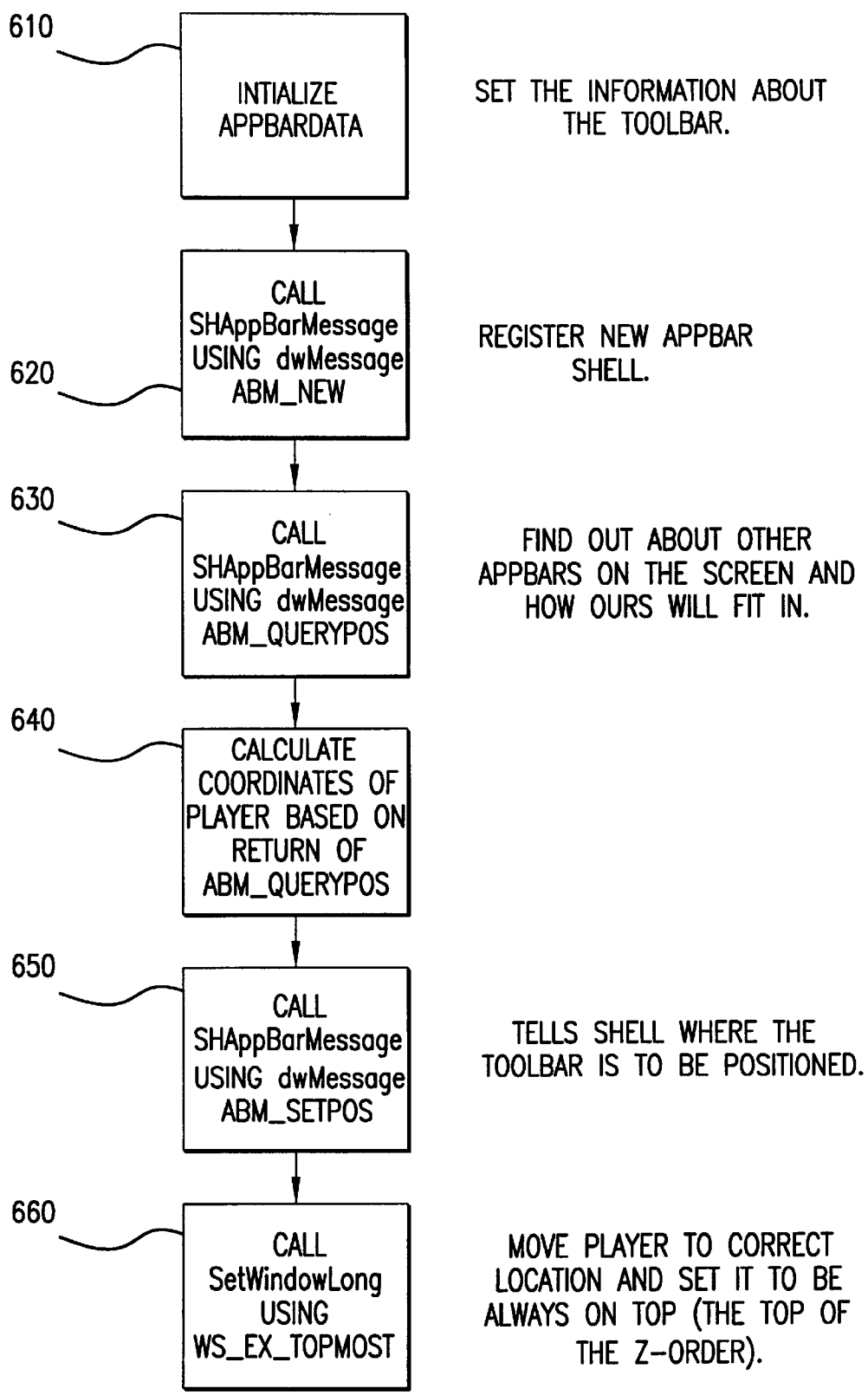
FIGS. 6A–B show a flowchart of a process for establishing and maintaining a user interface at a topmost window on a computer display screen.
Figure 6B:
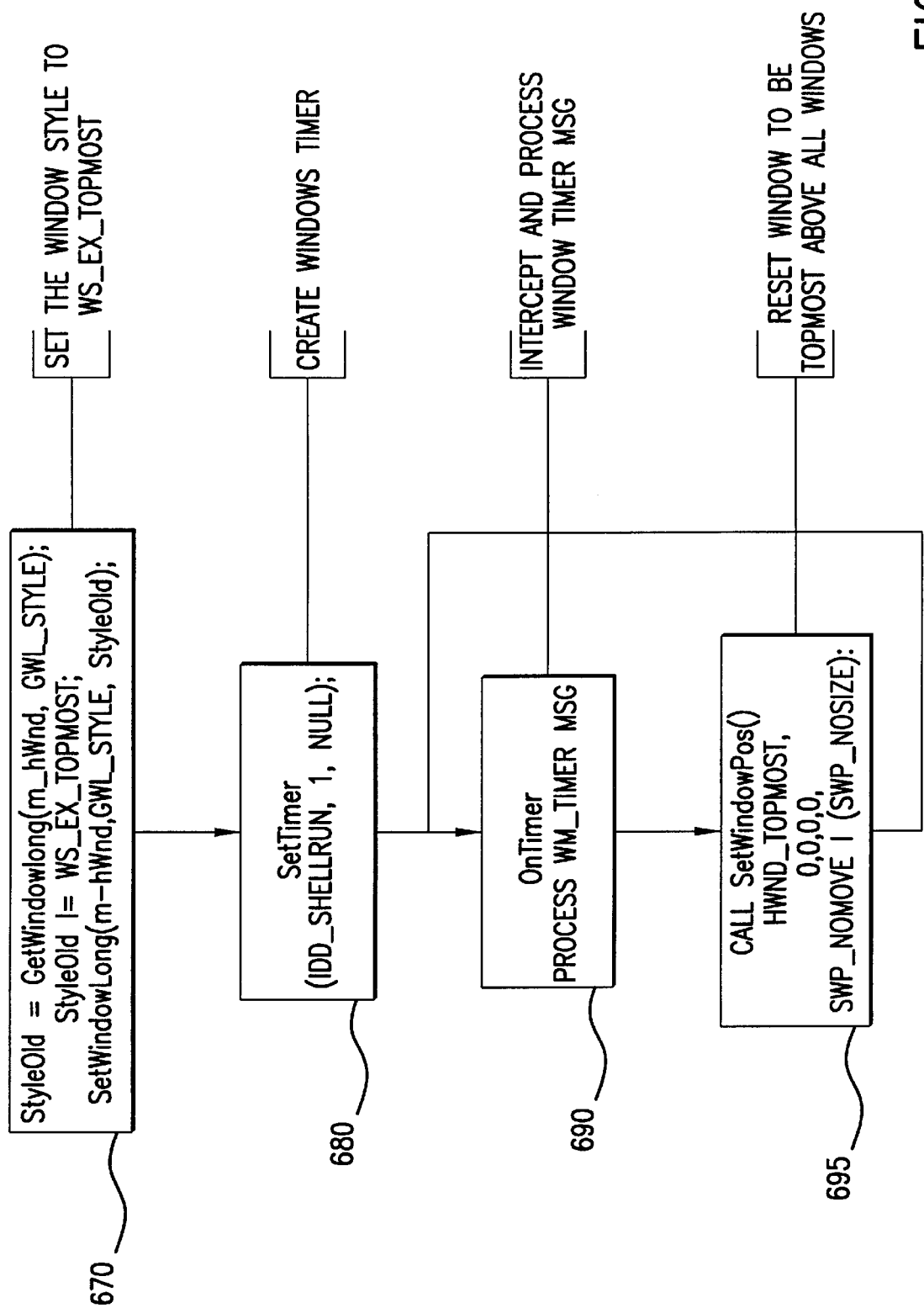

FIGS. 6A–B show a flowchart of a preferred embodiment of a process which may be executed by a player toolbar display program to create and automatically maintain a player toolbar 310 on a "topmost" level window (z-axis) of a computer display screen running under the WINDOWS® computer operating system. The process automatically places the player toolbar 310 on the "topmost" level window (z-axis) of a computer display screen without any user involvement, and also automatically ensures that the player toolbar 310 remains on the "topmost" level window (z-axis) of a computer display screen despite efforts by a user to remove it therefrom.

In a first step 610, the player toolbar display program initializes data regarding the player toolbar 310. Next, in a step 620, the player toolbar display program registers the player toolbar 310 with the shell of the computer's operating system program. Then, in a step 630, the player toolbar display program retrieves information from the shell regarding other application desktop toolbars for other computer programs which are open on the computer display screen.

From this information, in a step 640, the player toolbar display program calculates the coordinates (x/y axes) for the location of the player toolbar 310 to be displayed on the computer display screen. Then, in a step 650, the player toolbar display program informs the shell of the computer's operating system where the player toolbar 310 will be displayed on the computer display screen. Next, in a step 660, the player toolbar display program calls a subroutine to place the player toolbar 310 at the correct position (x/y axes) on the computer display screen and to make it the "topmost"

window on the stack (z-axis) of windows displayed on the user's computer display screen. In other words, the player toolbar 310 is displayed such that it is not covered by any other window or application desktop toolbar on the computer display screen. The player toolbar display program displays the player toolbar 310 at either the very top or the very bottom position on the computer display screen. All other open windows on the user's computer display screen are resized, or pushed up or down, to fit within the remaining available area on the user's computer display screen.

In a step 670, the player toolbar display program sets the window style for the player toolbar to be at the topmost position (z-axis) on the "stack" of windows on the computer display screen. Then, to insure that the player toolbar 310 maintains the topmost position on the stack of windows on the computer display screen, in a step 680 the player toolbar display program sets a timer to return a message when a predetermined time interval expires. Preferably, the predetermined time interval is set to a short enough duration to insure that the player toolbar 310 always appears to a user to be the topmost window. In a step 690, the player toolbar display program sets a handle so that when the timer expires, the player toolbar display program will recognize the timer. Finally, in a step 695, when the player toolbar display program receives the timeout message, the player toolbar display program calls a subroutine to again place the player toolbar 310 at the correct position on the computer display screen and to make it the "topmost" level window on the stack of windows displayed on the user's computer display screen. Then, the program returns to step 690 and repeats the loop. In this way, the player toolbar display program ensures that the player toolbar 310 remains at the "topmost" window on the stack of windows displayed on the user's computer display screen so long as the music player 120 is open.

In one embodiment, the player toolbar display program recognizes attempts by a user to cover the player toolbar 310 or to force the player toolbar 310 from being displayed on the "topmost" window on the stack of windows displayed on the user's computer display screen. In that case, the player toolbar display program displays a warning message to a user that the player toolbar must remain on the computer display screen at all times in order for the user to continue receiving music selections from the online music service provider. Optionally, after repeated attempts by a user to force the player toolbar 310 from being displayed as the "topmost" window on the stack (z-axis) of windows displayed on the user's computer display screen, the player toolbar display program may cause the music player to disconnect from the online music library, to stop playing music selections, and to close.

In an alternative embodiment where the user interface substitutes a floating window for the player toolbar, then the steps 670 through 695 of the above-described player toolbar display program may be used to create and automatically maintain the floating window on a "topmost" level window (z-axis) of a computer display screen running under the WINDOWS® computer operating system. The process automatically places the floating window on the "topmost" level window (z-axis) of a computer display screen without any user involvement, and also automatically ensures that the floating window remains on the "topmost" level window (z-axis) of a computer display screen despite any efforts by a user to remove it therefrom.

The user interface 250 may include other desirable features. For example, when a music selection is being delivered from the online music library 110 to the music player 120 and is being played through the user's computer, a special display scrolling window or "ticker" may be opened on the computer display screen wherein the song lyrics are scrolled. Also, the user interface 250 may include a control or button for allowing a user to "rip" a CD, that is, to copy music selections from a CD onto a hard disk drive in the user's computer.

While preferred embodiments are disclosed herein, many variations are possible which remain within the concept and scope of the invention. For example, although the preferred embodiment has been described in terms of an online music delivery system, the invention in its various aspects may be applied appropriately to an online video delivery system. Such variations would become clear to one of ordinary skill in the art after inspection of the specification, drawings and claims herein. The invention therefore is not to be restricted except within the spirit and scope of the appended claims.

What is claimed is:

1. A multimedia content delivery system for delivering multimedia content across a computer network to a user computer having a display screen, audio processing components, and an operating system supporting graphical user interfaces, the system comprising:

on online music library, comprising, a song file server for storing song files, and an online database of the song files; and a music player resident on the user computer for accessing the online database via the computer network and selecting therefrom selected song files to be delivered across the computer network to the user computer, wherein said music player includes a user interface displaying an advertisement on a topmost level of windows on the display screen at all times even when other computer programs are being executed by the user computer.

2. The system of claim 1, wherein the online music library further comprises a translation/streaming server receiving the selected song files from the song file server and communicating the selected song files across the computer network to the user computer.

3. The system of claim 2, wherein the computer network is the Internet, and wherein the music player further comprises:

an Internet interface for establishing an Internet connection between the user computer and the translation/streaming server;

a streaming music interface receiving the selected song files via the Internet; and an audio interface for providing the selected song files to the audio processing components of the user computer to be played by the audio processing components of the user computer.

4. The system of claim 1, wherein the user interface further comprises:

an interactive window comprising a plurality of user interface panes; and a plurality of handles each associated with a corresponding one of the user interface panes for opening and minimizing the corresponding user interface panes.

5. The system of claim 4, further comprising a close box for closing all of the user interface panes.

6. The system of claim 4, wherein the interactive window comprises:

a search pane for a user to search the online database;

a library pane for providing a hierarchical view of the song files in the database;

a playlist pane for providing a list of song file playlists to the user; and a channels pane providing a list of preprogrammed channels available through the online music library.

7. The system of claim 6, wherein the user interface further comprises a horizontal scroll bar which is displayed to a user when a width of open user interface panes exceeds a width of the display screen and which is not displayed to a user when the width of open user interface panes is less than the width of the display screen.

8. A method of delivering music to a user via a personal computer having a display screen and audio processing components, the method comprising:

displaying an advertisement on a topmost level of windows on the display screen at all times even when other computer programs are being executed by the personal computer;

providing an online music database of music selections;

displaying contents of the online music database to the listener via the display screen;

receiving from the user a list of selected music selections in the online music database; and delivering the selected music selections to the personal computer.

9. The method of claim 8, further comprising playing the selected music selections through the audio processing components.

10. The method of claim 8, further comprising delivering to the personal computer lyrics for the selected music selections.

11. The method of claim 8, further comprising storing a playlist comprising the list of selected music selections.

12. The method of claim 8, further comprising receiving from the user a scheduled playtime for the selected music selections, and wherein the selected music selections are delivered to the personal computer at the scheduled playtime.

13. A music player for a computer having a display screen, audio processing components, and an operating system supporting graphical user interfaces, the music player comprising:

an Internet interface for establishing an Internet connection between the computer and an online music library;

a streaming music interface for receiving a song file from the online music library via the Internet;

an audio interface for providing the song file to the audio processing components of the computer to be played by the audio processing components of the computer; and a user interface for user interaction with the music player, said user interface comprising, an advertisement component for displaying an advertisement on the display screen, and a display program for automatically setting said advertisement component to displayed in a topmost level of windows on the display screen at all times even when other computer programs are being executed by the computer.

14. The music player of claim 13, wherein the advertisement component comprises a floating window.

15. The music player of claim 13, wherein the advertisement component comprises a player toolbar.

16. The music player of claim 15, wherein the player toolbar comprises:

a player control pane including player controls for the song file being played by the music player; and an advertisement pane for displaying the advertisement.

17. The music player of claim 13, wherein the song file received by the streaming music interface is a compressed song file, and wherein the music player further comprises a decompressor for decompressing the compressed song file.

18. The music player of claim 13, wherein the user interface further comprises:

an interactive window comprising a plurality of user interface panes; and a plurality of handles each associated with a corresponding one of the user interface panes for opening and minimizing the corresponding user interface panes.

19. The music player of claim 18, wherein the interactive window comprises:

a search pane for a user to search an online database of song files in the online music library;

a library pane for providing a hierarchical view of the song files in the online database;

a playlist pane for providing a list of playlists to the user; and a channels pane providing a list of pre-programmed channels available from the online music library.

20. The music player of claim 13, wherein the user interface further comprises a scrolling window for displaying lyrics corresponding to a song file being played by the music player.

* * * * *